United States Patent
Roll et al.

(10) Patent No.: US 11,636,016 B2
(45) Date of Patent: Apr. 25, 2023

(54) CLOUD SIMULATION AND VALIDATION SYSTEM

(71) Applicant: AT&T Intellectual Property I, L.P., Atlanta, GA (US)

(72) Inventors: Jonathan Roll, Austin, TX (US); Edmund Barmettler, Round Rock, TX (US); Traci Walton-Jerald, Sugar Hill, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/895,170

(22) Filed: Aug. 25, 2022

(65) Prior Publication Data
US 2022/0405180 A1 Dec. 22, 2022

Related U.S. Application Data

(63) Continuation of application No. 17/237,172, filed on Apr. 22, 2021, now Pat. No. 11,461,206, which is a continuation of application No. 16/399,049, filed on Apr. 30, 2019, now Pat. No. 11,074,149.

(51) Int. Cl.
G06F 11/00 (2006.01)
G06F 11/22 (2006.01)
G06F 11/26 (2006.01)

(52) U.S. Cl.
CPC ........ *G06F 11/2289* (2013.01); *G06F 11/261* (2013.01)

(58) Field of Classification Search
CPC .............. G06F 11/2289; G06F 11/261; G06F 11/3457; G06F 11/3664; G06F 30/20; G06F 9/455; G06F 2111/02
See application file for complete search history.

(56) References Cited

U.S. PATENT DOCUMENTS 8,140,905 B2 3/2012 Beaty et al.
8,789,155 B2 7/2014 Jirka et al.
10,402,290 B2 9/2019 Tumkur et al.
(Continued)

OTHER PUBLICATIONS

Calheiros, Rodrigo N. et al., "CloudSim: a Toolkit for Modeling and Simulation of Cloud Computing Environments and Evaluation of Resource Provisioning Algorithms", John Wiley & Sons Ltd., 2010, 24 pages.

(Continued)

Primary Examiner — Marc Duncan
(74) Attorney, Agent, or Firm — Guntin & Gust, PLC; Jay Anderson

(57) ABSTRACT

Cloud simulation or validation system allows for the simulation of a future node that may be deployed on a piece of hardware. The system may attempt to simulate the operating system for node-A on top of the hardware for node-A, including basic network connectivity. When a host is booted up with the simulated configuration, validation scripts may be run to verify that the site is correctly prepped for cloud deployment. With its pre-staged RAM-based OS temporarily loaded into the host's RAM memory, any set of OS-based scripts, tools or binaries, may be executed for simulation and validation based upon the intended role of the host onto which the cloud simulation or validation system configuration is loaded.

20 Claims, 4 Drawing Sheets

(56) References Cited

U.S. PATENT DOCUMENTS

| | | | |
|---|---|---|---|
| 10,666,517 | B2 | 5/2020 | Maknojia et al. |
| 10,891,140 | B1 | 1/2021 | Levin et al. |
| 11,074,149 | B2 | 7/2021 | Roll et al. |
| 11,461,206 | B2 * | 10/2022 | Roll .................. G06F 30/20 |
| 2004/0078692 | A1 | 4/2004 | Jackson et al. |
| 2013/0247022 | A1 | 9/2013 | Dejana et al. |
| 2013/0247136 | A1 | 9/2013 | Chieu et al. |
| 2014/0223168 | A1 | 8/2014 | Chen et al. |
| 2015/0355997 | A1 | 12/2015 | Wall et al. |
| 2016/0321062 | A1 | 11/2016 | Du et al. |
| 2019/0213104 | A1 | 7/2019 | Qadri et al. |
| 2019/0243737 | A1 | 8/2019 | Savino et al. |
| 2019/0340108 | A1 | 11/2019 | Yabusaki |

OTHER PUBLICATIONS

Huang, Ryan et al.,"ConNalley: a Systematic Configuration Validation Framework for Cloud Services", ACM, 2015, 43 pages.

\* cited by examiner

CLOUD SIMULATION AND VALIDATION SYSTEM

CROSS-REFERENCE TO RELATED APPLICATIONS

This application is a continuation of U.S. patent application Ser. No. 17/237,172 filed on Apr. 22, 2021, which is a continuation of U.S. patent application Ser. No. 16/399,049 filed Apr. 30, 2019, now U.S. Pat. No. 11,074,149, in which the entire contents of which are hereby incorporated herein by reference.

BACKGROUND

Cloud systems are complex multi-layer hardware and software systems that consist of multiple components, interacting with each other through complicated mechanisms. As there is an attempt to scale the deployment of network cloud services, even small problems in the underlying platform can cause a chain reaction that results in major delays. These challenges may be exacerbated by the scale, complexity and the iterative design approach that characterize cloud deployments. Problems exist at every layer of the stack—from physical components of the compute nodes (e.g., power supply) through network problems such as firewall misconfigurations. The consequence is that the teams responsible for deployment into the cloud zones spend days, weeks, or months attempting deployment, fixing problems, and then reattempting deployment only to find the next problem in their way.

This disclosure is directed to addressing issues in the existing technology.

SUMMARY

Conventionally, large-scale deployments may take months to deploy because of a need to troubleshoot issues, among other issues. The disclosed system allows for automatic cloud simulation, validation, and subsequent implementation in a distributed manner. A method, for example, may include the following: obtaining a configuration payload for a cloud device, wherein the cloud device comprises a server that executes a cloud service or the like, wherein the configuration payload may include: 1) information associated with network configuration of the cloud device in overall cloud network design, 2) information associated with desired test results for the cloud device, or 3) information associated with configuration and test results of plurality of other devices associated with the cloud service; combining the configuration payload with an operating system for the cloud device; compressing the combined configuration; sending the combined configuration to a download server; subsequently sending instructions to the cloud device (also may include the other cloud devices) to obtain the (e.g., respective) combined configuration; booting (e.g., temporarily loading) in volatile memory, by the cloud device, the combined configuration obtained from the download server; and determining, by the cloud device, which parameters of the combined configuration (e.g., out of the plurality of parameters associated with the cloud service) apply to the cloud device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

The disclosed cloud simulation or validation system may be considered a simulation system that identifies and reports possible problems so that they can be fixed before a software deployment team begins an installation. The cloud simulation or validation system may perform its simulations and validations in the hardware itself rather than via external validations, such as ping from an external device. This may be significant because many of the problems found can be seen only from the local host itself rather than from a remote or central location.

The cloud simulation or validation system may be focused around pre-deployment testing, where site connectivity exists where software or machine-level OS may not yet be deployed. The cloud simulation or validation system allows cloud deployment teams to simulate the future node that may be deployed on hardware, allowing more advanced pre-deployment validation work. This simulation work may be individual node aware, in that the system may attempt to simulate the OS for node-A on top of the hardware for node-A, including basic network connectivity (Bonding, VLANs, and IP assignments). When a host (e.g., cloud server) is booted with this simulated configuration (e.g., install the simulated configuration), validation scripts may be run to verify that the site is correctly prepped for cloud deployment. With its pre-staged RAM-based OS temporarily loaded into the host's RAM memory, any set of OS-based scripts, tools, or binaries, may be executed for simulation and validation based upon the intended role of the host onto which the cloud simulation or validation system configuration is loaded.

Figure 1:
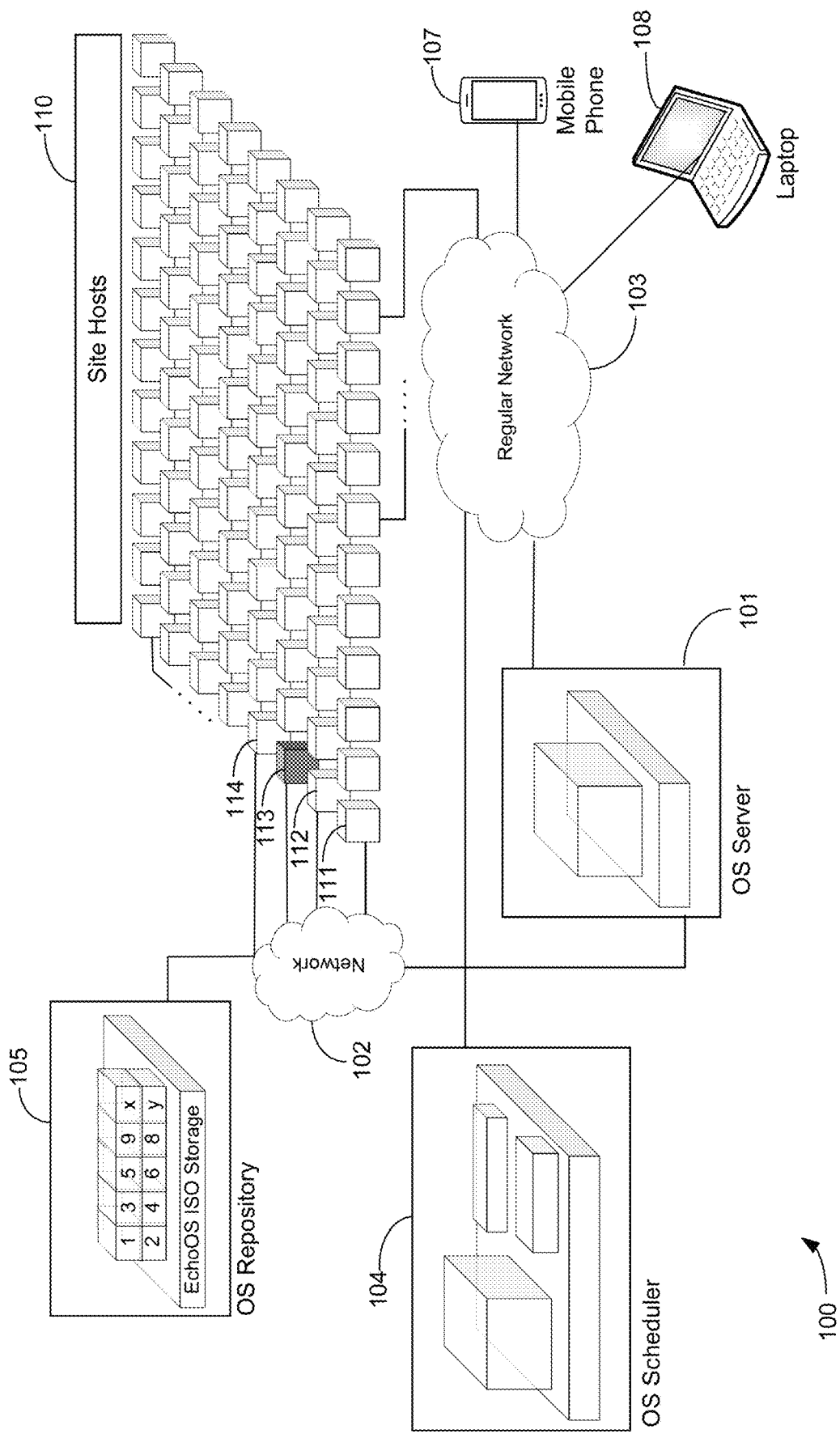
FIG. 1 illustrates an exemplary system 100 that may use a cloud simulation or validation system.

FIG. 1 illustrates an exemplary cloud simulation or validation system 100. A data center (or the like site) may host thousands of servers (commonly tens of thousands of servers). In this scenario, there may be group 110 (e.g., a subset of 100 servers within the site) that may be idle and waiting to be dedicated to a particular cloud service or multiple cloud services for a future tenant or multiple future tenants of the data center. These idle servers of group 110 (e.g., including server 111-server 114) may arrive blank from the factory except for basic settings and components. Example settings and components may allow for out-of-band connectivity, ability to turn servers off and on via out-of-band connection, and an option to boot an operating system (OS). As shown in FIG. 1, out-of-band connectivity may be via network 102 and in-band connectivity may be via network 103. The servers of group 110 (also referred herein as group 110) may be equipped with an out-of-band controller. Before regular deployment, as discussed in more detail herein, the servers of group 110 (e.g., server 111-server 114) may be communicatively connected with OS server 101, OS scheduler 104, or OS repository 105. After deployment, mobile phone 107, computing device 108, or other devices (e.g., OS server 101, OS scheduler 104, or OS repository 105) may be communicatively connected with the servers of group 110 via network 103.

Figure 2:
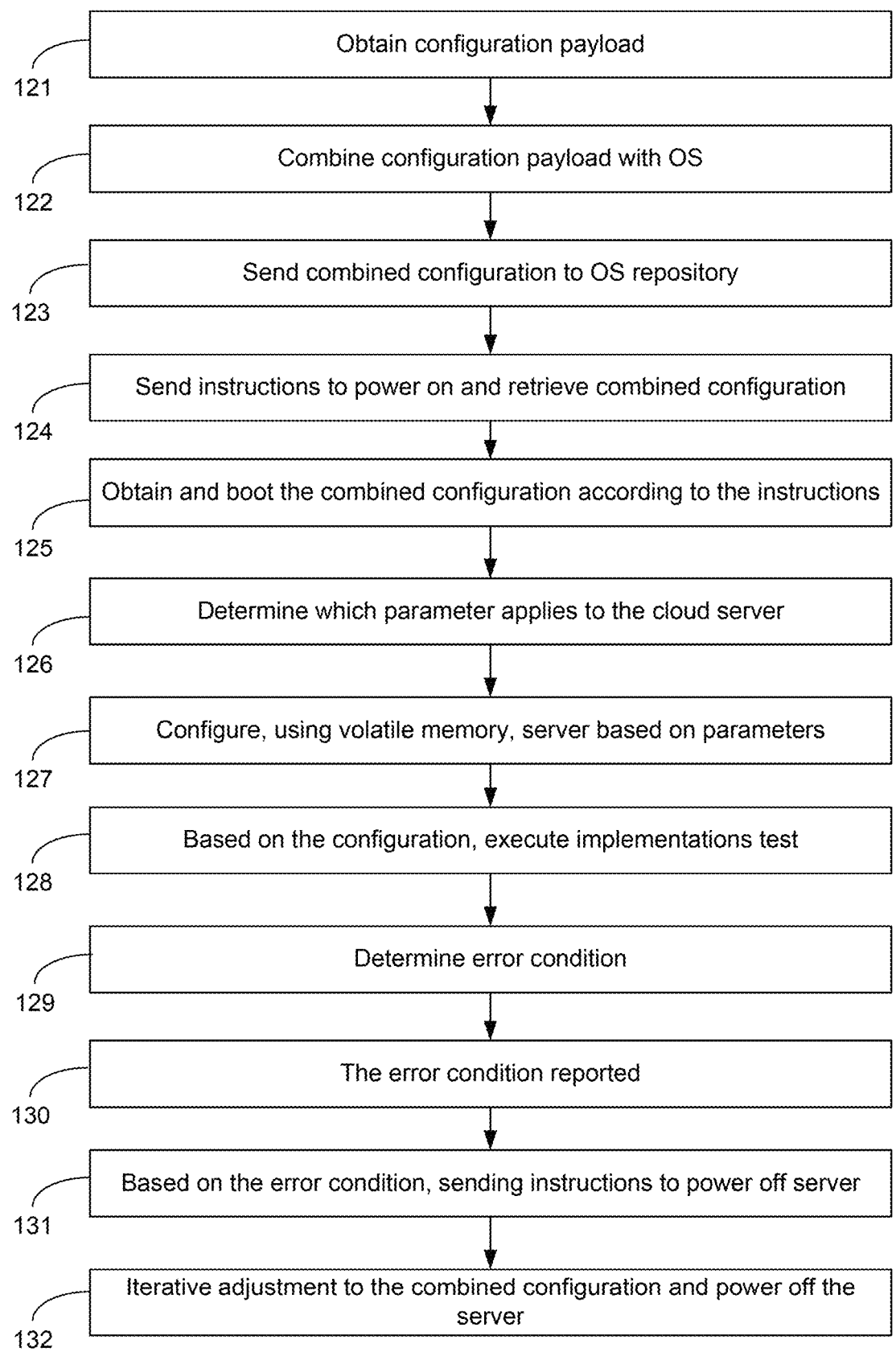
FIG. 2 illustrates an exemplary method for implementing a cloud simulation or validation system.

FIG. 2 illustrates an exemplary method for implementing a cloud simulation or validation system. At step 121, a configuration payload (e.g., cloud service design) for group 110 may be created or obtained by using OS server 101. The cloud service design may include configuration information for each server of group 110 that may be used in an actual implementation (e.g., an implementation in persistent memory handed over the permanent use of a tenant). There may be configuration information unique to a particular server in the cloud service design, there may be configuration information common to all servers of group 110 in overall cloud service design, or there may be configuration information associated with expected test results (e.g., ability to communicate with external devices through network 103) for the particular cloud device or the overall cloud service. Example configuration information unique to the particular server may include internet protocol address, host names, disk layout, RAID configuration, disk sizing, physical cabling, VLAN configuration, or asset metadata, such as serial # or MAC address. Example configuration information common to servers of group 110 may include BIOS mode, boot sequence, redundancy policy, power configurations, shared storage configurations, DNS namespaces, upstream cloud controller software, single root input/output virtualization, or network layer flow points. Example expected test results may include ability to detect server hardware faults, ability to detect server configuration errors, ability to see all/only shared storage intended for host, ability to verify cabling is correct and fully redundant, or verification that hardware specs match inventory.

With continued reference to FIG. 2, at step 122, the configuration payload may be combined with an operating system (the combined configuration payload and OS may be referred herein as combined configuration). At step 123, the combined configuration may be sent to OS repository 105 (e.g., a download server), which may have one or more combined configurations. OS repository 105 may store the combined configuration for later retrieval by one or more servers of group 110. The combined configuration may be compressed at OS repository 105 in order to reduce the size of the file (e.g., an ISO image or the like file). The compression (using common file compression techniques as well as a minimalized version of OS) of the file may be significant since the disclosed system may require hundreds of downloads of the combined configuration and there may be significant bandwidth and other savings if the combined configuration is reduced to a size that is as small as possible.

At step 124, OS scheduler 104 may send instructions to the servers of group 110 to power on or retrieve the combined configuration of step 123. It is contemplated that there may be multiple combined configurations on OS repository 105, therefore OS scheduler 104 may send instructions to the servers of group 110 and identify which of the multiple combined configurations to download. OS scheduler 104 may coordinate the order in which servers of group 110 are powered on, when the combined configuration is downloaded, or when the combined configuration is booted. In an example, this coordination may be based on instructions sent to each server of group 110 that give a time for downloading or the schedule may reside on OS scheduler 104 and instructions may be sent to group 110 at each server scheduled time of power on or booting. The downloads, booting, or testing may be scheduled in a staggered fashion (e.g., based on the number of servers being tested in group 110) so that OS scheduler 104, OS repository 105, or OS server 101 are not overwhelmed.

At step 125, group 110 may obtain and boot up the combined configuration according to the instructions of step 124. For example, server 111 of group 110 may be booted at time t0 and server 112 of group 110 may be booted at time t1, wherein t0 and t1 are different times. It is also significant that the combined configuration may be booted in random access memory (RAM) or other types of volatile memory. Volatile memory is computer memory that requires power to maintain the stored information; it retains its contents while powered on but when the power is interrupted, the stored data is immediately discarded . Using RAM as disclosed allows for automatic programmatic testing to be easily and efficiently repeated on a large distributed scale, particularly when there is a need to tweak the configuration based on errors in previous steps. Further, the use of RAM allows for no trace to be left behind during actual implementation (e.g., "permanent" implementation) of the tenant in the future.

At step 126, each server of group 110, may determine based on analysis of the combined configuration, which parameter of the combined configuration out of the plurality of parameters associated with the cloud service may apply to the server. For example, server 111 may be identified by serial number, asset tag, or another identifier. Based on the identifier of server 111, it may identify which unique configuration (e.g., network identifiers or test) it should use upon boot up, while server 112 identifies the appropriate unique configuration, and so on. At step 127, based on the determination of step 126, each server of group 110 is configured. In an example, with reference to step 126 and step 127, among others, server 111 boots up, may mount an ISO (the ISO extracts itself into memory) and origination scripts within the combined configuration may start. So, the configuration payload may be examined and server 111 tries to determine who it is and after figuring that out it determines what section of the combined configuration it is (e.g., I'm server 111), and it uses all the data for server 111 to configure itself as it is booting up to match what server 111 is supposed to be. Other than server 111 losing all its configuration during power down (again the configuration is ephemeral), it may look and act like the permanent server.

At step 128, based on the configuration of step 127, each server of group 110 may automatically execute validation tests. The validation tests for each server may include network accessibility to network 103, each other, or beyond (e.g., mobile phone 107), storage tests (e.g., verifying storage is accessible, mountable, writable, or with the correct capacity and quantities), or simulation tests associated with the cloud system (e.g., physical redundancy tests such as network link failover testing and hardware benchmark testing), among other things. In example, server 113 tries to connect with OS server 101 via network 103. If able to connect with OS server 101 via network 103, then OS may be considered functional and many test cases (e.g., 50) may be covered already by this indicated connection (e.g., this connection may signify that the flows work, firewall works, etc.). If server 113 cannot communicate with OS server 101 then this may be an indication of a flaw in network design, such as bad cabling or bad switch configuration, which subsequent tests in this first iteration may narrow down and eventually identify with some certainty. The narrowing down may be based on machine learning of previous errors and resolutions. Dozens or even thousands of tests may be run within minutes or hours. Server 113 may wait for a period (e.g., 10 minutes or 2 hours) before, it shuts itself down. The period may be determined by the error and the type of trouble shooting or resolution needed based on the error. In another example, if OS server 101 via network 103 is accessible, then there may be additional tests triggered based the error conditions of other servers in group 110. There may be some coordination that may happen between the OS scheduler 104 and servers of group 110. So additional tests may be triggered in order to perform advanced tests that may wait until all or a threshold percentage of the servers are booted up. Advanced tests may include as putting load on the network for most hosts or making sure that each server of group 110 can talk across the network with each other. Validation test (e.g., including advanced tests) may include tests for detecting whether a firewall is up, DNS is up, NTP is up, all disks are there, disks are correct size, disks have correct serial numbers, disks are correct type—solid state drive (SSD) or mechanical, etc.

At step 129, based on the validation test of step 128, an error condition is determined. If there are errors, then OS scheduler 104, for example, may flag those errors and alert OS server 101, which may work on configuration changes to the combined configuration. In an example, there may be an error condition for server 113. At step 130, the error condition for server 113 may be reported to OS scheduler 104. At step 131, based on the error condition, sending instructions to power off (or power cycle) server 113. Powering off (or power cycling) server 113 will erase the combined configuration and allow for easier implementation of a subsequent (e.g., second) iteration of combined configuration, if needed. And whether or not errors are found, server 113, for example, may end the simulation and power off. So, the OS disappears when server 113 turns off as if the combined configuration was never there. Note the error conditions, testing, or the like may be relayed on a dashboard. In an example, the dashboard may indicate that 4 servers out of 100 servers have issues. And out of the 4 servers there may be 15 items that may need to be addressed.

At step 132, subsequent to analysis of the error conditions there may be a second iteration of combined configuration. This second iteration may be updated to address the error conditions. For example, corrected configuration information, updated remote network endpoints, or updates to fix flaws in platform design. Steps 121-132 may be repeated several times based on the error conditions and adjustments. There may be iterative adjustments to the combined configuration and power cycling the server until there is no significant error based on the validation tests. In addition, there may be messages sent to one or more departments (e.g., firewall or network Routing teams, physical cable installers, planning engineers, or deployment teams) to address the error condition of step 129. For example, a message may be sent to a firewall group to change parameters of the firewall connected with network 103 in order to remove restrictions that affect connectivity. In another example, there may be an observation that that a server does not boot-up (e.g., there is an error that server won't turn on), which would probably be indicated at or about step 124. This may indicate bad hardware and a message may be sent to have the hardware vendor fix or replace equipment.

For additional perspective, with reference to FIG. 1 and FIG. 2, generally, during an implementation, the appropriate communication (e.g., out-of-band connectivity) and power wiring are connected and, initially, there may be minimal software on the servers. The servers may be awaiting boot-up and deployment of software to implement a cloud service. A vendor has out-of-band controller card on each server of group 110, which allows for the servers to be turned off and on remotely and the console of the server may be viewed remotely. In addition, even with the minimal software, each server of group 110 has the capability to boot an OS to do an install remotely. Our disclosed system provides for distributed booting of those OS's in non-persistent (e.g., volatile) memory and allows it to be done relatively efficiently. Intelligent Platform Management Interface (IPMI) or the like may be used for the distributed booting, power cycling, or other monitoring. The disclosed system may also reduce the need for servers to use specialized auto configuration technology and may work across different types of server vendors that may be in included in group 110.

Ubuntu along with Linux live or the like may be used in the combined configuration disclosed herein. Conventionally, Linux live systems are known for being booted directly from a physically inserted CD or USB drive (which is contrary to RAM booting disclosed herein).

The disclosed cloud-related techniques may provide a way to efficiently implement and test implementation of cloud devices for a cloud network. The techniques may allow for mass testing and reduce personnel need for implementing a cloud service. Putting test OS on the RAM contrary to persistent memory (e.g., non-volatile memory) may be beneficial, because using persistent memory risks leaving something behind which in turn may break the deployment script that would have configured the persistent memory.

Note that OS repository 105, OS server 101, and OS scheduler 104 are represented by different blocks, herein it is contemplated that their functionality may be incorporated into one, two, three, or more devices. The disclosed system may be used before the environment is put into service or after. Put into service may mean when the environment is already running traditional OS in read only memory.

Cloud system, cloud service, or cloud, in the context of the disclosure, may refer to one or more physical or virtual servers that together comprise a single interconnected compute platform or multiple interconnected heterogeneous cloud platforms.

Simulation tests may include ability to provide network services intended for that host such as PXE, DNS, NTP, HTTP, or other common "server services", which other hosts can test against. Additional simulation tests may include physical redundancy tests such as network link failover testing and hardware benchmark testing.

Figure 3:
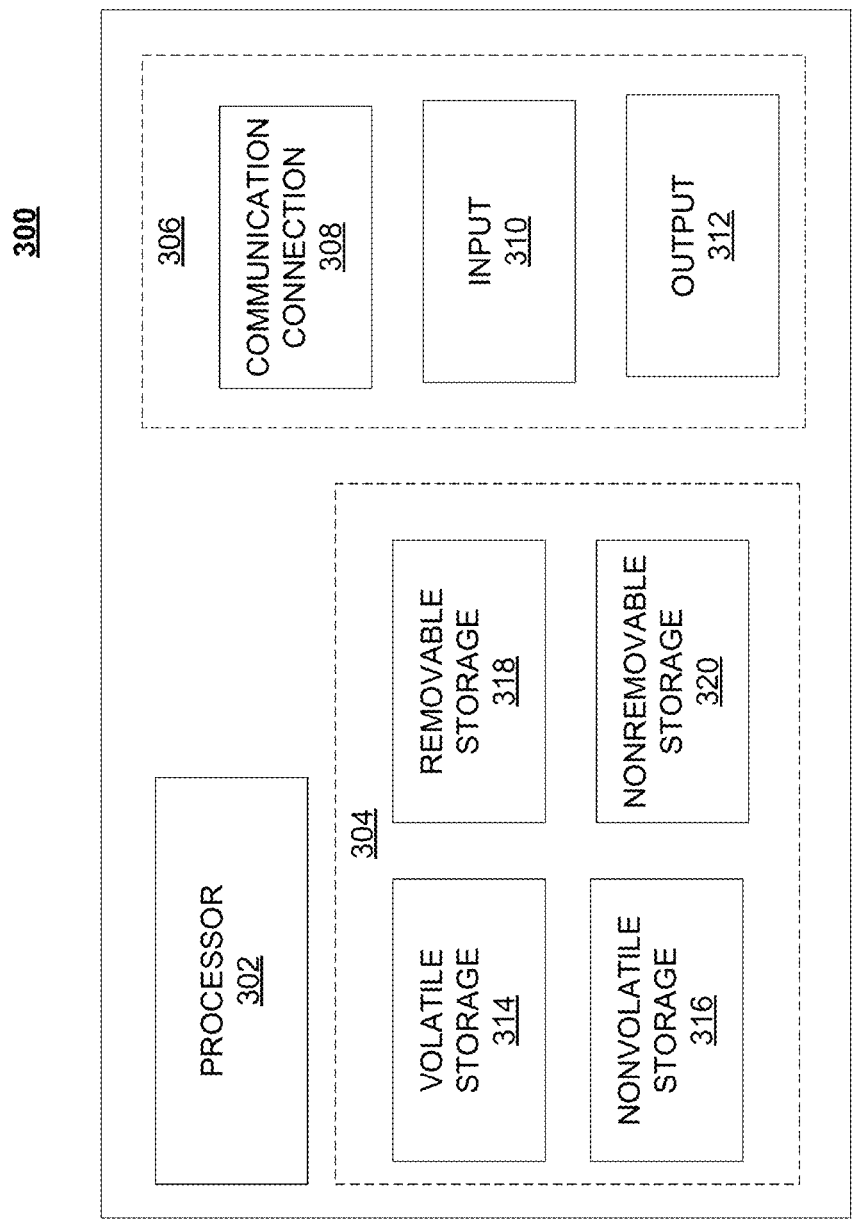
FIG. 3 illustrates a schematic of an exemplary network device.

FIG. 3 is a block diagram of network device 300 that may be connected to or comprise a system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
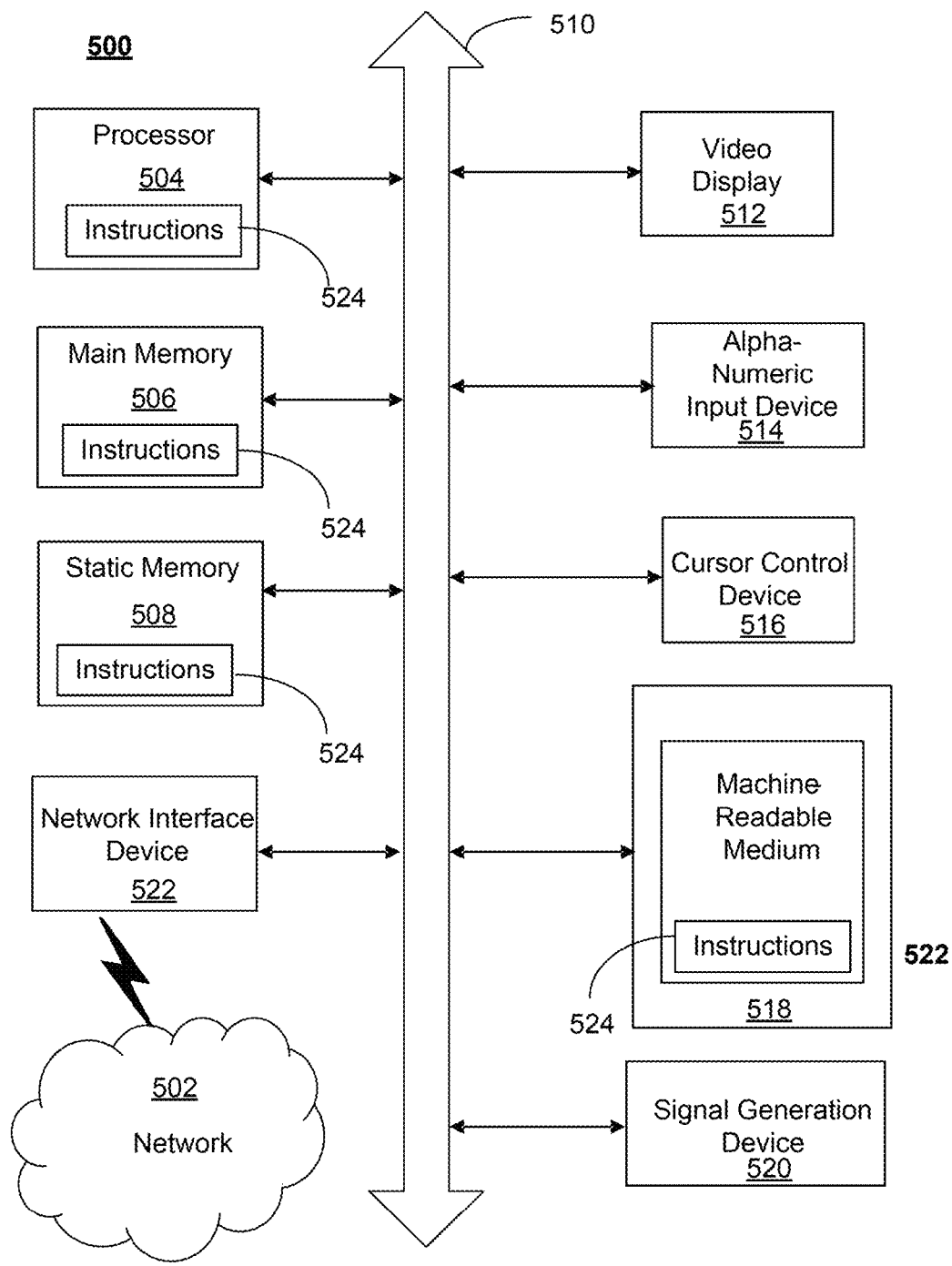
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the cloud simulation or validation system methods described herein. One or more instances of the machine can operate, for example, as processor 302, OS server 101, OS repository 105, OS scheduler 104, mobile phone 107, HSS 422, laptop 108 and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which cloud simulation or validation system alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—cloud simulation or validation system—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps. or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for cloud simulation or validation system. A method, for example, may include the following: obtaining a configuration payload for a cloud device, wherein the cloud device comprises a server that executes a cloud service or the like, wherein the configuration payload may include: 1) information associated with network configuration of the cloud device in overall cloud network design, 2) information associated with desired test results for the cloud device, or 3) information associated with configuration and test results of plurality of other devices associated with the cloud service; combining the configuration payload with an operating system for the cloud device, wherein the operating system is a Linux live operating system; compressing the combined configuration (e.g., a first iteration); sending the combined configuration to a download server; subsequently sending instructions to the cloud device (also may include the other cloud devices) to obtain the (e.g., respective) combined configuration; booting in volatile memory, by the cloud device, the combined configuration obtained from the download server; determining, by the cloud device, which parameters of the combined configuration (e.g., out of the plurality of parameters associated with the cloud service) apply to the cloud device; based on the parameters that apply to the cloud device configuring the cloud device; based on the parameters that apply to the cloud device automatically executing validation tests of the cloud device, wherein the validation test comprises: 1) network accessibility test, 2) storage test, or 3) simulation test; determining an error condition based on the validation tests; reporting the error condition to an error condition server; based on the error condition, sending instructions to power cycle the cloud device, wherein the $1^{st}$ combined configuration is deleted due to power cycle; subsequent to the power cycle, obtaining a $2^{nd}$ iteration of combined configuration, wherein the $2^{nd}$ iteration of the combined configuration is updated to address the error condition; and iteratively adjusting the combined configuration and power cycling the cloud device until there is no significant error based on the validation tests. All combinations in this paragraph (including the removal or addition of steps) are contemplated in a manner that is consistent with the other portions of the detailed description.

What is claimed:

1. A method comprising:
   receiving, by a cloud server of a group of cloud servers, a configuration payload, wherein the configuration payload includes a cloud server configuration comprising first network configuration parameters unique to the cloud server, and second network parameters common to the group of cloud servers, and wherein the configuration payload further includes expected test results;
   loading, by the cloud server, the cloud server configuration in volatile memory of the cloud server;
   configuring the cloud server based on the cloud server configuration;
   performing, by the cloud server, validation tests; and
   determining, by the cloud server, an error condition based on the validation tests and the expected test results.

2. The method of claim 1, further comprising receiving, by the cloud server, instructions to power on and retrieve the configuration payload.

3. The method of claim 2, wherein the receiving the configuration payload comprises retrieving the configuration payload from an operating system (OS) repository based on the instructions.

4. The method of claim 1, wherein the configuration payload further comprises an operating system.

5. The method of claim 1, wherein the performing the validation tests comprises performing the validation tests for a cloud service that is implemented using the cloud server.

6. The method of claim 1, further comprising reporting the error condition to an error condition server.

7. The method of claim 1, wherein the validation tests comprise a storage performance test.

8. A system comprising:
   a processing system including a processor; and
   a memory that stores executable instructions that, when executed by the processing system, facilitate performance of operations, the operations comprising:
   receiving, by a cloud server of a group of cloud servers, a message requesting that the cloud server power on and retrieve a configuration payload;
   retrieving, based on the message, the configuration payload, wherein the configuration payload includes a cloud server configuration comprising first network configuration parameters unique to the cloud server, and second network parameters common to the group of cloud servers, and wherein the configuration payload further includes expected test results;
   loading, by the cloud server, the cloud server configuration in volatile memory of the cloud server;
   configuring the cloud server based on the cloud server configuration;
   performing, by the cloud server, validation tests; and
   determining, by the cloud server, an error condition based on the validation tests and the expected test results.

9. The system of claim 8, wherein the receiving the configuration payload comprises retrieving the configuration payload from an operating system (OS) repository based on the message.

10. The system of claim 8, wherein the configuration payload further comprises an operating system.

11. The system of claim 8, wherein the performing the validation tests comprises performing the validation tests for a cloud service that is implemented using the cloud server.

12. The system of claim 8, wherein the operations further comprise reporting the error condition to an error condition server.

13. The system of claim 8, wherein the validation tests comprise a storage performance test.

14. A non-transitory machine-readable medium, comprising executable instructions that, when executed by a processing system including a processor, facilitate performance of operations, the operations comprising:
   receiving, by a cloud server of a group of cloud servers, a configuration payload, wherein the configuration payload includes a cloud server configuration comprising first network configuration parameters unique to the cloud server, and second network parameters common to the group of cloud servers, and wherein the configuration payload further includes expected test results;
   configuring the cloud server based on the cloud server configuration;
   performing, by the cloud server, validation tests; and
   determining, by the cloud server, an error condition based on the validation tests and the expected test results.

15. The non-transitory machine-readable medium of claim 14, further comprising receiving, by the cloud server, a message requesting the cloud server to power on and retrieve the configuration payload.

16. The non-transitory machine-readable medium of claim 15, wherein the receiving the configuration payload comprises retrieving the configuration payload from an operating system (OS) repository based on the message.

17. The non-transitory machine-readable medium of claim 14, wherein the configuration payload further comprises an operating system.

18. The non-transitory machine-readable medium of claim 14, wherein the performing the validation tests comprises performing the validation tests for a cloud service that is implemented using the cloud server.

19. The non-transitory machine-readable medium of claim 14, further comprising reporting the error condition to an error condition server.

20. The non-transitory machine-readable medium of claim 14, wherein the validation tests comprise a storage performance test.

* * * * *